No. 784,439. PATENTED MAR. 7, 1905.
P. T. SIEVERT.
APPARATUS FOR PRODUCING HOLLOW GLASS ARTICLES.
APPLICATION FILED FEB. 17, 1904.
2 SHEETS—SHEET 1.
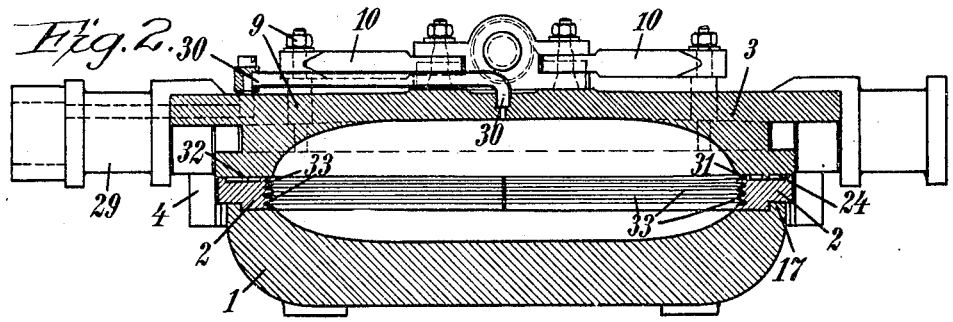
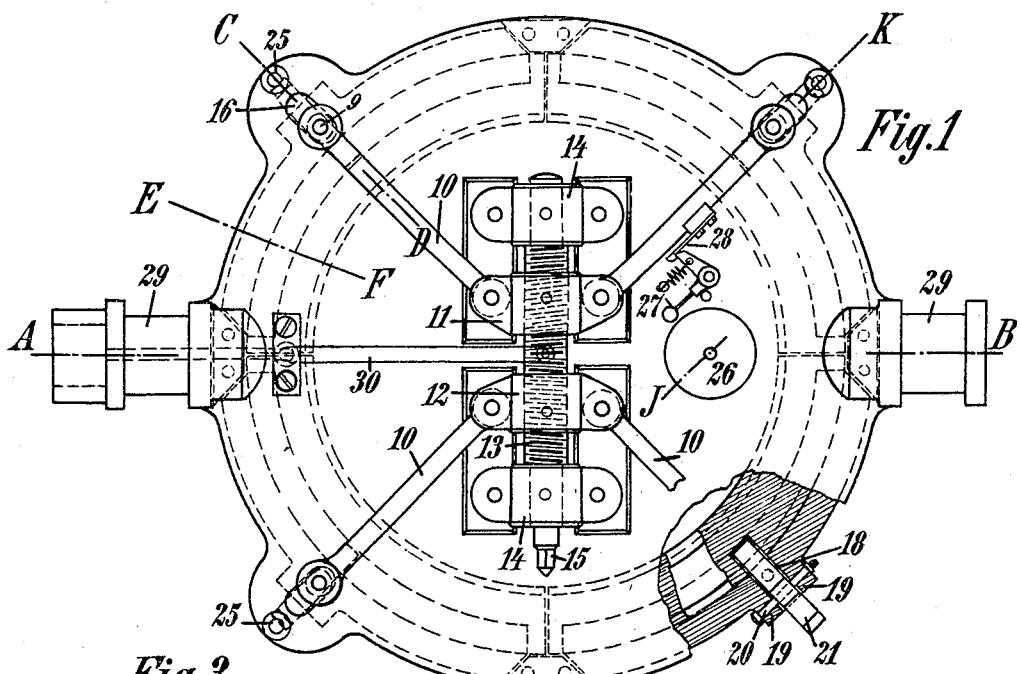
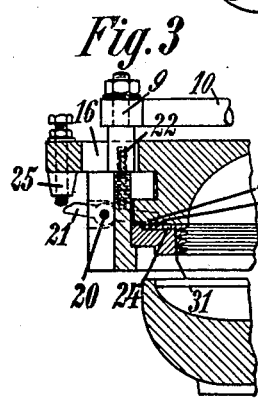
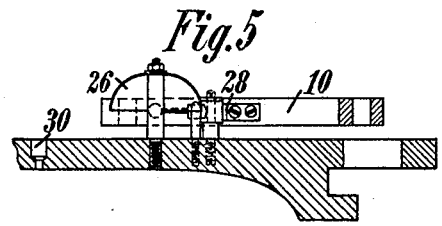
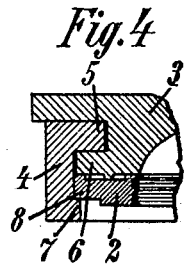
WITNESSES:
A. L. O'Brien
Olin A. Foster
INVENTOR
Paul Theodor Sievert
By Dickerson Brown
Raegener & Binney
Attys No. 784,439. PATENTED MAR. 7, 1905.
P. T. SIEVERT.
APPARATUS FOR PRODUCING HOLLOW GLASS ARTICLES.
APPLICATION FILED FEB. 17, 1904.
2 SHEETS—SHEET 2.
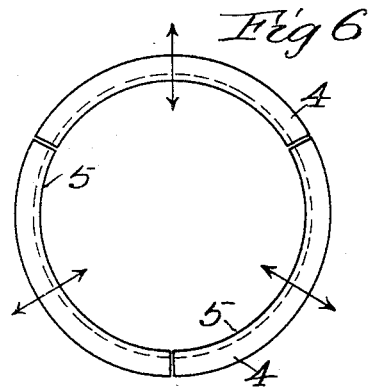
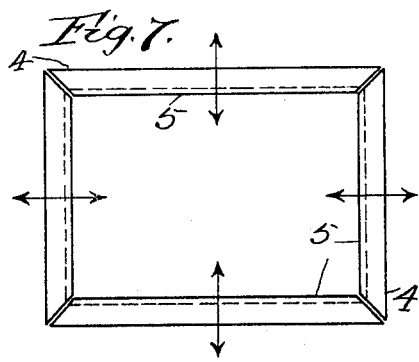
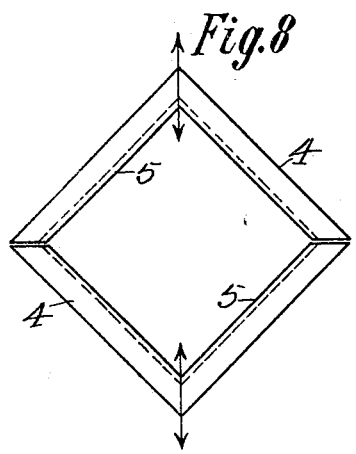
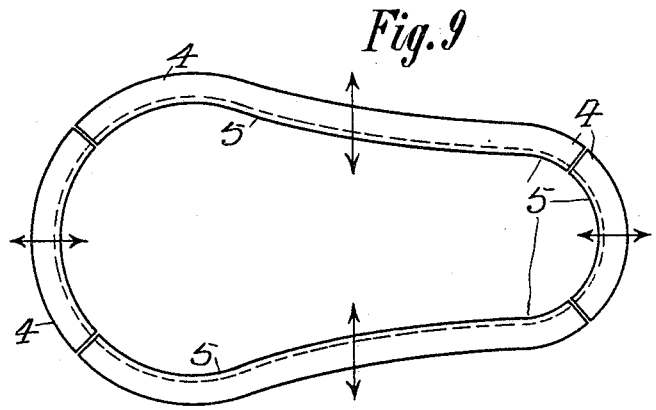
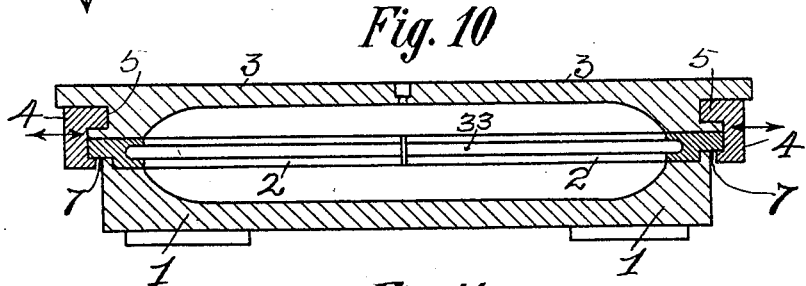
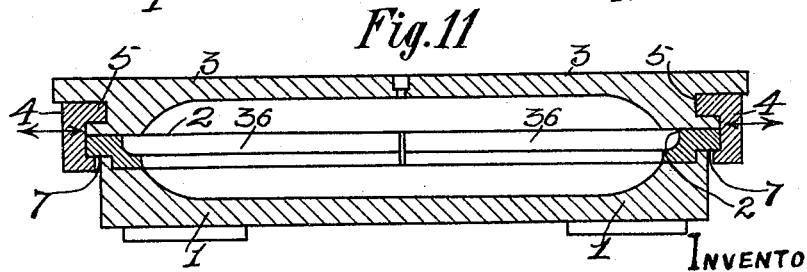
WITNESSES:
A. L. O'Brien
Olin A. Foster
INVENTOR
PAUL THEODOR SIEVERT
BY Dickerson, Brown,
Raegener & Binney
Attys.

No. 784,439. Patented March 7, 1905.

UNITED STATES PATENT OFFICE.

PAUL THEODOR SIEVERT, OF DRESDEN, GERMANY.

APPARATUS FOR PRODUCING HOLLOW GLASS ARTICLES.

SPECIFICATION forming part of Letters Patent No. 784,439, dated March 7, 1905.

Application filed February 17, 1904. Serial No. 194,078.

*To all whom it may concern:*

Be it known that I, PAUL THEODOR SIEVERT, a subject of the Emperor of Germany, and a resident of Dresden, Germany, have invented certain new and useful Improvements in Apparatus for Producing Hollow Glass Articles, of which the following is a specification.

The art of producing hollow glass bodies from a mass of glass resting upon a supporting-plate and surrounded by a grooved frame in which the mass of glass is supported when the frame is removed is already known.

My invention consists of a device by which the frame, with the mass of glass adhered thereto, may be lifted off the supporting-plate. Such a device is specially adapted to be used with the machine shown in United States Patent No. 745,391, in which the frame, with the glass mass adhered thereto, is extended by rotating it about a substantially vertical axis.

The device of the present invention consists of a supporting-plate of any suitable shape, a frame divided into a plurality of parts resting upon the frame, and a covering-piece adapted to engage the frame and to raise it, with the mass of glass adhered thereto, directly away from the supporting-plate. The shape of the supporting body of glass may then be altered as desired, the parts of the frame drawn asunder, so as to free the glass article therefrom, and the covering-piece may be engaged with a new frame holding another cake or mass of glass.

A signaling device is also provided to inform the attendant workman when the glass body is about to be freed from its support.

The accompanying drawings show a preferred form of construction of my device, in which—

Figure 1 is a top plan view of the device, partly broken away. Figs. 2, 3, 4, and 5 are transverse sections on the lines A B, C D, E F, J K, respectively, of Fig. 1. Figs. 6 to 9, inclusive, are top plan views of modified forms of the supporting-frame. Figs. 10 and 11 are transverse sections showing similar modifications.

1 designates the supporting-plate, which is represented as of dish form, but may, if desired, be flat without any tray-like depression, especially where the body to be produced does not require a considerable quantity of glass. On the upper edge of the plate 1 rests the divided frame 2, shown as consisting of four segmental parts. The frame is provided with a groove or grooves 33, into which the plastic glass enters and by which the mass of glass is supported when the bottom plate is removed.

On the frame 2 rests the covering-piece 3, which is provided with suitable means for engaging the frame. These means are shown as a divided clamping or catcher ring 4, composed of four segmental parts, and suitable mechanism for actuating the same. As shown, the catcher-ring 4 has two inwardly-extending flanges 5 and 7, the flange 5 engaging over an outwardly-extending flange 6 of the cover 3, while the flange 7 engages beneath a flange 8, which forms the edge of the frame 2. The flange is shown as divided into four segments, each of which is connected to a bar 10 by means of a bolt 9. The bars 10 are pivotally attached to nuts 11 and 12 on a bolt 13. The bolt is provided with a right and left thread and turns in suitable eyes 14, which effect the movement of the nuts 11 and 12 in opposite directions, which movement of rotation may, *e. g.*, be effected by a key engaging with the squared end piece 15 of the bolt.

The bolts 9, through which the segments of the catcher-ring are connected with the bars 10, are guided in slots 16 in the cover 3. When the bolt 13 is rotated and nuts 11 and 12 thereby moved, a radial movement of the segments of the catcher-ring 4 toward or from each other will be effected. When the nuts have been moved as far as possible toward each other, the catcher-ring is in the position shown in Fig. 1 of the drawings, the lower flanged edge of the catcher-ring engaging beneath the edge of the frame 2, so that the frame will be raised with the cover. On the other hand, the frame is released, when by turning the bolt 13 the nuts 11 and 12 and the parts of the catcher-ring are moved away from each other. On the cover 3 are trunnions 29, by means of which or by any suitable means the cover may be raised and moved.

The operation of the device is as follows: The bottom plate 1 having been placed in desired position, the segmental frame 2 is placed upon it and the hollow space filled with the liquid mass of glass substantially to the upper edge of the frame. The cover 3 is then placed upon the frame and the bolt 13 turned so as to engage the flanges 7 of the catcher-ring under the edge 8 of the frame 2. The cover and frame may then be integrally lifted off the bottom plate 1, with the glass cake securely held in the grooves of the frame. The middle portion of the glass body is now freely suspended and may be widened or turned into any desired shape by its own weight or by centrifugal force resulting from a suitable rotating movement, or the expansion of the glass mass may be increased by the introduction of compressed air or other elastic medium through the tube 30, shown as axially placed in the cover 3. When the glass article is completed, the catcher-ring 4 is again opened by a proper rotation of the bolt 13. During this operation the pawls 23 of the levers 21 (shown in Fig. 3 of the drawings) lie in a groove 24 of the frame and engage with the segments of the frame to draw the same from the glass body as the catcher-ring is moved outward. Before the movement has been carried to a point where the glass body is detached a bell may be sounded to inform the attendant workman. In Fig. 1 is shown a means to this end in which a hammer 27 is caused to strike against a gong 26 when released from a trip 28, secured on one of the bars 10. The glass body is then placed upon a suitable supporter and the frames completely withdrawn therefrom by a further radial outward movement of the catcher-ring. The cover 3, with the frame 2 attached, may then be moved and rested upon a suitable base and the catcher-ring still further opened. The pawl-levers 21 will then strike against the screws 25, (shown in Fig. 3 of the drawings,) lifting the pawls 23 out of the groove 24, whereby the frame is disengaged from the cover 3, and the cover may be engaged with any frame which has previously been engaged with a cake of glass in the manner already described.

It is evident that many modifications may be made in the form and arrangement of the parts of my device without departing from the spirit of the invention. Thus the number of segments in the frame and in the catcher-ring is immaterial, as indicated in Fig. 6 of the drawings, as is also the number of glass-engaging grooves 33 in the frame, one only of such grooves being shown in Fig. 10 of the drawings, while in Fig. 11 the ring is shown as having an annular recess 36, which answers the purpose of the groove and is intended to be included thereby in the language of the claims. It is also clear that the means for causing the disengagement of the portions of the catcher-ring from the flanges of the segmental ring may be considerably varied from that shown. Where it is not desired to use compressed air or the like for expanding the mass of glass, the cover 3 may have an opening of any suitable size and shape.

In Figs. 7 to 9, inclusive, I have shown modifications of the form of catcher-ring, to which, of course, the form of the corresponding parts of the device would necessarily conform. Fig. 7 indicates that the glass article to be made would be of rectangular section. Fig. 8 indicates a square section, and Fig. 9 indicates a device for making the well-known glass bathtub.

By the term "clamping-ring" as used in the claims I of course intend to include any form of clamping or catcher ring whether of circular section or of any other section, whether or not illustrated in Figs. 7, 8, and 9.

It is obvious that parts of my device may be used without the others and that various changes may be made in the form and arrangement of parts without departing from my invention.

Having thus described my invention, what I claim, and desire to secure by Letters Patent, is—

1. A device for producing hollow glass articles comprising a supporting-plate, a divided frame having a glass-engaging inner surface, a cover, and means for detachably engaging said cover and said frame.

2. A device for producing hollow glass articles comprising a dished supporting-plate, a divided frame vertically disengageable from said plate and having a glass-engaging interior surface, a cover, and means for detachably engaging said cover with said frame.

3. A device for producing hollow glass articles comprising a supporting-plate, a divided frame having a glass-engaging inner surface, a cover, and a divided clamping-ring for detachably engaging said cover with said frame.

4. A device for producing hollow glass articles comprising a supporting-plate, a divided frame having a glass-engaging inner surface, a cover, a clamping-ring consisting of a plurality of parts, and means for moving said parts inwardly and outwardly toward and from a common center to engage and disengage said cover and said frame.

5. A device for producing hollow glass articles comprising a supporting-plate, a divided frame having a glass-engaging inner surface, a cover, a clamping-ring consisting of a plurality of parts, and means for moving said parts inwardly and outwardly toward and from a common center to engage and disengage said cover and said frame, including a right and left threaded screw and connections between said screw and said ring parts.

6. A device for producing hollow glass articles comprising a supporting-plate, a divided frame having a glass-engaging inner surface, a cover, a clamping-ring consisting of a plurality of parts, means for moving said parts inwardly and outwardly toward and from a common center to engage and disengage said cover and said frame, and signaling means operating during said disengagement.

7. A device for producing hollow glass articles comprising a supporting-plate, a divided frame having a glass-engaging inner surface, a cover, means for detachably engaging said cover and said frame, and means for introducing fluid-pressure into the space between said cover and a mass of glass carried by said frame.

8. A device for producing hollow glass articles comprising a supporting-plate, a divided frame having a glass-engaging inner surface, a cover, and means on said frame and said cover for first detaching said frame from the mass of glass carried thereby and for afterward detaching said frame from said cover.

9. A device for producing hollow glass articles comprising a supporting-plate, a divided frame having a glass-engaging inner surface, a cover, a segmental clamping-ring guided to move radially on said cover, a right and left threaded screw on said cover, nuts on said screw, and connecting-bars between said nuts and the segments of said ring, whereby the latter are radially moved.

10. A device for producing hollow glass articles comprising a supporting-plate, a divided frame having a glass-engaging inner surface, a cover, a segmental clamping-ring guided to move radially on said cover, a right and left threaded screw on said cover, nuts on said screw, connecting-bars between said nuts and the segments of said ring, whereby the latter are radially moved, a bell on said cover, and a trip on one of said connecting-bars for sounding said bell during the movement of said segments.

11. A device for producing hollow glass articles comprising a supporting-plate, a divided frame having a glass-engaging interior surface, a cover, a segmental clamping - ring guided to move radially on said cover and provided with upper and lower inwardly-extending flanges for engaging respectively with said cover and said frame, and means for moving said clamping-ring toward and from its center.

In testimony whereof I have signed this specification in the presence of two subscribing witnesses.

PAUL THEODOR SIEVERT.

Witnesses:
PAUL E. SCHILLING,
PAUL ARRAS.